US010083326B2

(12) United States Patent
Claes et al.

(10) Patent No.: US 10,083,326 B2
(45) Date of Patent: Sep. 25, 2018

(54) METHOD OF ACCESSING A PHYSICALLY SECURED RACK AND COMPUTER NETWORK INFRASTRUCTURE

(71) Applicant: Fujitsu Technology Solutions Intellectual Property GmbH, München (DE)

(72) Inventors: Heinz-Josef Claes, Nidderau (DE); Ulrich Feldmann, Arnsberg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 92 days.

(21) Appl. No.: 15/116,602

(22) PCT Filed: Jan. 26, 2015

(86) PCT No.: PCT/EP2015/051458
§ 371 (c)(1),
(2) Date: Aug. 4, 2016

(87) PCT Pub. No.: WO2015/117850
PCT Pub. Date: Aug. 13, 2015

(65) Prior Publication Data
US 2016/0357993 A1    Dec. 8, 2016

(30) Foreign Application Priority Data

Feb. 6, 2014  (DE) ........................ 10 2014 101 495

(51) Int. Cl.
*G06F 21/86*      (2013.01)
*G07C 9/00*       (2006.01)
(Continued)

(52) U.S. Cl.
CPC .............. *G06F 21/86* (2013.01); *G06F 21/31* (2013.01); *G06F 21/602* (2013.01);
(Continued)

(58) Field of Classification Search
CPC ........ G06F 21/86; G06F 21/31; G06F 21/602; G07C 9/00571; H04L 63/0428; H04L 63/062
See application file for complete search history.

(56) References Cited

U.S. PATENT DOCUMENTS 6,300,873 B1    10/2001  Kucharczyk et al.
6,856,363 B2     2/2005  Kim
(Continued)

FOREIGN PATENT DOCUMENTS

CN    102346945 A    2/2012
EP    0 649 957 A2   4/1995
(Continued)

OTHER PUBLICATIONS

Hounsham et al., Evaluating Access Control Locks Against Low Technology Attack, Oct. 2009, 43rd Annual 2009 International Carnahan Conference on Security Technology, pp. 329-334 (Year: 2009).*

(Continued)

*Primary Examiner* — Kenneth W Chang
(74) *Attorney, Agent, or Firm* — DLA Piper LLP (US)

(57) ABSTRACT

A method of accessing a physically secured rack includes assigning a task identification by a key computer system, which specifies a task for an administrator of an administration user group for access to the rack, transmitting the task identification from the key computer system to the administrator and an access control unit for the rack, prompting an input of the task identification by the access control unit, verifying the input task identification by the access control unit, prompting input of a personal access identification of the administrators by the access control unit, verifying the input personal access identification of the administrator by the access control unit, and releasing a physical access (Continued)

security system for the access to the administrator to the rack if both preceding verification steps are successful.

11 Claims, 1 Drawing Sheet

(51) Int. Cl.
*G06F 21/31* (2013.01)
*G06F 21/60* (2013.01)
*H04L 29/06* (2006.01)

(52) U.S. Cl.
CPC ...... *G07C 9/00571* (2013.01); *H04L 63/0428* (2013.01); *H04L 63/062* (2013.01)

(56) References Cited

U.S. PATENT DOCUMENTS

| | | | |
|---|---|---|---|
| 2003/0231102 A1 | 12/2003 | Fisher | |
| 2004/0039920 A1* | 2/2004 | Kim | E05B 47/0603 713/185 |
| 2005/0179349 A1* | 8/2005 | Booth | E05B 47/026 312/257.1 |
| 2007/0180492 A1* | 8/2007 | Hassan | G06F 21/629 726/2 |
| 2008/0271122 A1* | 10/2008 | Nolan | G06F 21/32 726/4 |
| 2009/0169020 A1* | 7/2009 | Sakthikumar | G06F 21/57 380/278 |
| 2011/0012709 A1* | 1/2011 | Payson | G07C 9/00103 340/5.61 |
| 2012/0095926 A1 | 4/2012 | Nishimura et al. | |
| 2012/0314862 A1 | 12/2012 | Min | |
| 2014/0320259 A1* | 10/2014 | Marsden | G07C 9/00563 340/5.52 |
| 2015/0186677 A1* | 7/2015 | Sankar | G06F 21/71 726/34 |

FOREIGN PATENT DOCUMENTS

| | | |
|---|---|---|
| JP | 2002-21383 | 1/2002 |
| JP | 2002-251378 | 9/2002 |
| JP | 2004-102520 | 4/2004 |
| JP | 2009-37573 | 2/2009 |
| JP | 2011-221911 | 11/2011 |
| JP | 2012-003513 | 1/2012 |
| JP | 2012-78995 | 4/2012 |
| WO | 2013/060068 A1 | 5/2013 |

OTHER PUBLICATIONS

"One-time password," Wikipedia, http://en.wikipedia.org/w/index/ph;?title=One-time_password&oldid=589404530: Jan. 6, 2014.

"Access control," Wikipedia, URL: en.wikipedia.org/w/index.php?title=Access_control&oldid=592993645: Jan. 29, 2014.

Japanese Office Action dated Nov. 28, 2017, of corresponding Japanese Application No. 2016-550491, along with an English translation.

* cited by examiner

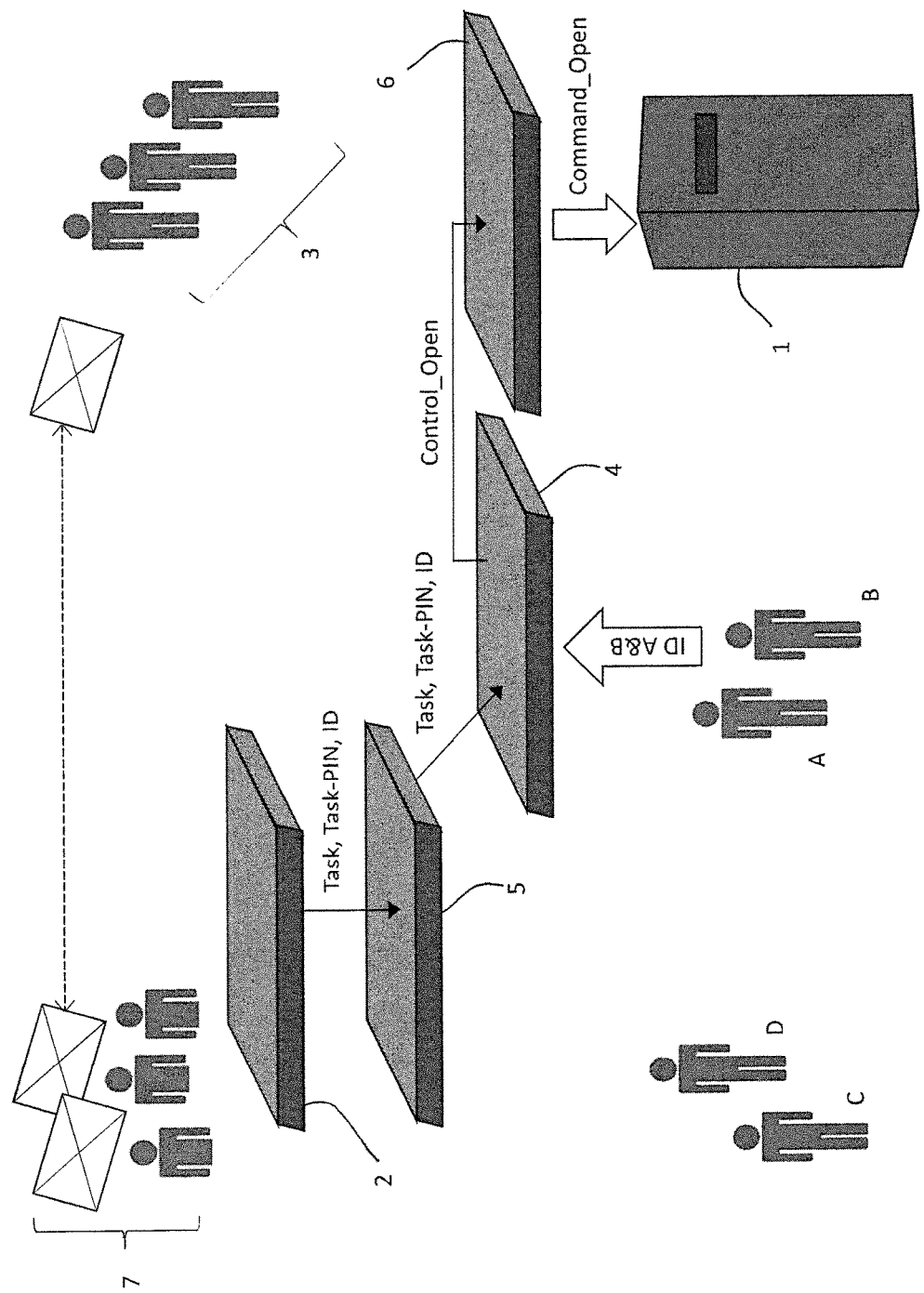

METHOD OF ACCESSING A PHYSICALLY SECURED RACK AND COMPUTER NETWORK INFRASTRUCTURE

TECHNICAL FIELD

This disclosure relates to a method of accessing a physically secured rack and a computer network infrastructure.

BACKGROUND

To prevent non-authorized access to a rack capable of accommodating hardware and provided in a computer center, for example, various solutions are known. Those solutions come with the disadvantage that most of the times access control is effected only to the entire computer center. Fixedly defined codes or keys for access security systems, for example, to monitor access to a rack with a data security relevant computer system accommodated therein, are bound to only one entity outside the rack. For example, codes or keys of authorized persons can be handed over to non-authorized persons and be stolen from authorized persons. Further, some of the known concepts for identification of persons provide only transferrable identifications, for example, chip cards, cell phones or smartphones, PIN codes and the like, which could also be handed-over to non-authorized persons or stolen from authorized persons.

It could therefore be helpful to improve measures for a secured physical access to a physically secured rack and prevent non-authorized access to a secured rack.

SUMMARY

We provide a method of accessing a physically secured rack including assigning a task identification by a key computer system, which specifies a task for an administrator of an administration user group for access to the rack, transmitting the task identification from the key computer system to the administrator and an access control unit for the rack, prompting an input of the task identification by the access control unit, verifying the input task identification by the access control unit, prompting input of a personal access identification of the administrators by the access control unit, verifying the input personal access identification of the administrator by the access control unit, and releasing a physical access security system for the access to the administrator to the rack if both preceding verification steps are successful.

We also provide a computer network infrastructure including a key computer system that generates and assigns a task identification, which specifies a task for an administrator of an administration user group, a rack, an access control unit that detects and verifies the task identification as well as detects and verifies a personal access identification of the administrator, and a physical access security system coupled to the access control unit for controlled access of the administrator to the rack depending on a successful verification of the task identification as well as the personal access identification of the administrator.

We further provide a computer network infrastructure including a key computer system that generates and assigns a task identification, which specifies a task for an administrator of an administration user group, a rack, an access control unit that detects and verifies the task identification as well as detects and verifies a personal access identification of the administrator, and a physical access security system coupled to the access control unit for controlled access of the administrator to the rack depending on a successful verification of the task identification as well as the personal access identification of the administrator, set up to perform the method of accessing a physically secured rack including assigning a task identification by a key computer system, which specifies a task for an administrator of an administration user group for access to the rack, transmitting the task identification from the key computer system to the administrator and an access control unit for the rack, prompting an input of the task identification by the access control unit, verifying the input task identification by the access control unit, prompting input of a personal access identification of the administrators by the access control unit, verifying the input personal access identification of the administrator by the access control unit, and releasing a physical access security system for the access to the administrator to the rack if both preceding verification steps are successful.

BRIEF DESCRIPTION OF THE DRAWING

The FIGURE shows a schematic arrangement of multiple security entities of our computer network infrastructure.

LIST OF REFERENCE NUMERALS 1 rack
2 key computer system
3 administration user group
4 access control unit
5 task control unit
6 rack control unit
7 security user group
A, B, C, D administrators
task task description
task PIN task identification
ID personal access identification
Control_Open instruction for releasing the physical access security system
Command_Open command for releasing the physical access security system

DETAILED DESCRIPTION

Our method comprises:
assigning a task identification by a key computer system that specifies a task for an administrator of an administration user group for access to the rack,
transmitting the task identification from the key computer system to the administrator and an access control unit for the rack,
prompting input of the task identification by the access control unit,
verifying the input task identification by the access control unit,
prompting input of a personal access identification of the administrator by the access control unit,
verifying the input personal access identification of the administrator by the access control unit, and
releasing a physical access security system for access of the administrator to the rack when both preceding verification steps were successful.

Such a method provides the advantage that physical access to the rack is released only when an entity identification, assigned by an independent entity (key computer system), to identify a task for the administrator for access to the rack has been successfully inputted besides a personal identification of the administrator. This way, physical access to the rack depends on information having to be filed in an entity in or at the rack (access control unit) and that cannot be evaded by an administrator. In addition, the administrator needs to authenticate as well.

The term rack relates to an assembly carrier, insert device carrier, computer rack, server rack or general hardware rack that receives or accommodates electronic data processing components. For example, such a rack accommodates one or multiple production computer systems. Such a rack may further have a door for access to the interior of the rack so that a person has physical access to the electronic components inside the rack. The door may be lockable so that only authorized persons are granted access.

The task identification serves for specification of a predetermined, possibly restricted access to a predetermined rack. The task identification may set a predetermined administrator also in dependence on a person. For example, the task identification may form a "ticket" for the administrator or some type of temporary key for a temporarily restricted access to the rack or a combination thereof.

Application of the method is possible, for example, in a multitude of racks, for example, in computer centers, wherein one or multiple production computer systems and/or other hardware is/are arranged in the plurality of racks, for example. The task for an administrator for access to an individual predetermined rack can be restricted by the task identification. The administrator does not have access to the remaining racks. Further, assigning a task identification allows documentation of the assigned tasks in the key computer system, which increases traceability of assigned tasks or performed accesses to predetermined racks.

Thus, the proposed method generally provides the advantage that in addition to a personal access identification of an administrator, a task identification for access to the rack is prompted, which is generated individually for an access task by an independent entity (key computer system) and sent to an administrator. The task identification restricts access of the administrator to a predetermined rack. This way, it is prevented that an administrator receives access to all computer systems in a computer center exclusively based upon a personal access identification.

Further, access to the rack is possible only if the corresponding access control unit was pre-programmed with the assigned task identification. That means that access to the rack is not exclusively possible through an entity (administrator) outside the racks, but instead must be additionally authorized by an entity at or in the rack (access control unit) based upon identifications assigned individually for the task.

Especially in the combination of task identification and personal access identification, the asset of the proposed method becomes clear. The personal access identification restricts an access option exclusively to authorized persons per se. If applicable, no other person may be sent who had not been authorized with a corresponding access task. In addition, the task identification restricts access to a specifically assigned task (timely, locally, depending on the device or rack, or person or the like). That means that even an authorized person whose personal access identification would generally allow access to the rack is denied access unless a task has been assigned specifically to that person by task identification. As a result, combination of personal access identification of an administrator and a task identification specifically assigned for an access by a key computer system as independent security entity allows a high degree of security.

Advantageously, the personal access identification of the administrator comprises non-transferable personal identification data. The identification data comprise biometric data such as a finger print, iris recognition, retinal scan, hand vein matching, voice profiles and the like. "Non-transferable" means that the information cannot be handed over from person to person like a password, numerical code, chip card or the like. In fact, falsification of such non-transferable information is extremely elaborate which significantly increases access protection of the racks. This ensures that exclusively a person is granted access to the rack, who is authorized to access. The personal access identification cannot be transferred by simple means to non-authorized persons or be stolen therefrom.

Preferably, at least one user of a security user group has access to the key computer system to assign the task identification. Optionally, assigning the task identification in the key computer system may also be effected based upon a four-eyes principles or multi-eyes principles. The security user group may be (or advantageously has to be) different from the administration user group. In this case, an administrator does not have access to the key computer system and may not access the key computer system (in a manipulative manner) to assign a task identification to him/herself. This way, a mandatory multi-person system is required.

Alternatively, the administration user group, possibly restricted to predetermined persons, may have access to the key computer system to assign the task identification. In this case, an increased degree of security is ensured as well because, actually, an administrator may theoretically assign a task identification to him/herself, but needs to generate a corresponding task identification each time access to the rack is desired or required. This way, as described above, documentation and traceability of assigned tasks or performed accesses to the rack is ensured. In this case, too, an undesired free access of an administrator to the rack or even all computer systems is suppressed in an entire computer center.

Advantageously, the access control unit is arranged at the location of the rack. The access control unit may be part of the rack, i.e., be integrated therein. Alternatively, the access control unit is an individual security system arranged logically and/or physically separated from the rack, but may communicate with the rack to control secured access. The decisive factor is that an authorized person needs to enter his or her personal access identification and the task identification at the location of the rack by the access control unit. As a result, it may be ensured, eventually using additional access control (video systems, key/lock systems and the like, for example), that only authorized persons remain at the location of the rack and are not replaced by non-authorized persons after a successful authorization at the access control unit.

Preferably, the method of the described type is performed at least for a second administrator of the administration user group besides the first administrator. A second task identification is provided for the second administrator, which is different from the first task identification. In addition, a second personal access identification is provided, which is different from the first personal access identification. A release of the physical access security system for the access of the administrators to the rack can only be effected if the verification steps were successful for both administrators.

This provides the advantage that a multi-person system applies to the administration user group. One administrator alone is not able to perform the method. The method may be designed for more than two administrators just as well. For example, at least two administrators and a security person (from another group of persons) may be required. The more persons need to be involved in the method, the higher is the degree of ensured security.

Preferably, the method comprises the additional steps:
producing a task description by the key computer system for the specified performance of access of the administrator or the administrators to the rack,
transmitting the task description to both the administrator(s) and a task control unit, and
waiting for a confirmation of the task description by the administrator(s).

The task description allows setting and documenting certain parameters for the performance of the access to the rack. The parameters determine the manner of how access to the rack is designed and performed, for example, time, duration, group of persons, security measures in the rack (e.g., a security backup, establishing restore points, encryption of confidential data and the like in one or more production computer systems in the rack). The task description need be taken note of and confirmed by the administrator(s). Alternatively, the task description may be generally transmitted to the administration user group and confirmed generally by the group.

Preferably, the method comprises the additional steps:
transmitting the task identification from the key computer system to the task control unit, and
transferring the task identification from the task control unit to the access control unit if confirmation of the task description was received by the administrator(s) from the task control unit.

Advantageously, the task identification is transferred to the access control unit not before confirmation of the task description by the administrator(s). Otherwise, respective identification is not saved within the access control unit. Despite knowledge of the task identification by the administrator(s), access to the rack is denied because positive comparative information is not saved there. As an alternative, the task description may be confirmed generally by the administration user group just as well. Another alternative or additional option provides that only confirmation of the task per se is required to transfer the task identification from the task control unit to the access control unit.

Generally, it is to be ensured by the above measures that an administrator or administrators of the administration user group get access to the rack not before taking note of and confirming the task per se, possibly by the task description. This also increases security in the proposed multi-entity access method.

Advantageously, the method of the described type comprises the additional steps of:
transferring the task description from the task control unit to the access control unit that the confirmation of the task description by the administrator(s) was received by the task control unit, and
verifying validity of the access of the administrator(s) to the rack by the access control unit by the task description.

The further measures provide the advantage that the access control unit may decide, based upon verification of the task description, if access is possible or permitted at all in dependence of the situation. This way, access may be denied even though the personal access identification of the administrator(s) as well as the respective task identification are properly verified. Such situation may be present, for example, if a scheduled security backup or encryption of confidential data or the like has not been performed or completed in one or more production computer systems in the rack so that access is not or not yet possible due to other aspects and for reasons beyond the required access information.

Alternatively, task description may be confirmed generally by the administration user group.

It is to be understood, according to the transfer of the task description, a transfer of the personal access identification of the administrator(s) from the key computer system via the task control unit to the access control unit is also possible after confirmation by the administrator(s) or the administration user group in the task control unit. As an alternative, personal access identifications of the respective administrators may be pre-stored within the access control unit already. A transfer or storing of the personal access identification may be performed in an encrypted fashion, if required. This ensures that a non-authorized collection of confidential access identifications by non-authorized third parties is prevented.

Advantageously, a user of a security user group has access to the key computer system to establish the task description. The security user group may (or should) be different from the administration user group, in analogy to the above description. That means that an administrator does not have access to the key computer system and cannot access the key computer system (in a manipulative manner) to define a task description in his or her favor. Thus, a mandatory multi-person system is required in connection with this aspect as well.

Alternatively, an administrator of the administration user group may get access to the key computer system to establish the task description. In this case, increased security is ensured in that a task description needs to be established and confirmed by administrators who want to get access to the rack, in any case before transferring respective task identifications to the access control unit according to the above described measures.

Preferably, the task description includes a predetermined time period for access to the rack and/or a predetermined time frame for release of the physical access security system of the rack. Time period relates to a date from . . . to . . . in which access is possible in principle. Time frame relates to the duration of the access as from the start of access. By way of example, access is provided between Monday 12 am and Tuesday 12 am, with the access time frame being one hour. That means that access is possible for one hour between Monday 12 am and Tuesday 12 am. This way, a timely limited authorization is ensured for an access to the rack. Thus, task description defines a type of session with specified time period, within which a task identification can be entered valid only for an access to the rack. Alternatively, the above mentioned features may just as well be defined directly in the task identification instead of the task description.

We also provide a computer network infrastructure, comprising:
a key computer system that generates and assigns a task identification that specifies a task for an administrator of an administration user group for access to a rack,
a rack,
an access control unit that detects and verifies the task identification as well as detects and verifies a personal access identification of the administrator, and
a physical access security system coupled with the access control unit for controlled access of the administrator to the rack depending on a successful verification of the task identification as well as the personal access identification of the administrator.

Such a computer network infrastructure having the above components provides the advantage that access to the rack by the physical access security system can be released only if both a personal access identification and a task identification assigned by an independent entity (key computer system) are successfully verifiable in the access control unit. As a result, the computer network infrastructure provides components for a secured access to the hardware of a rack (e.g., one or multiple production computer systems) designed such that the access depends on a combination of multiple security information.

The key computer system acts as a security entity capable of generating and assigning a task identification to specify predetermined, possibly restricted access to a specified rack. The access control unit is a further security entity set up to detect and verify the task identification generated by the key computer system. Further, the access control unit that detects and verifies a personal access identification of the administrator serves as a further security request besides task identification. The physical access security system is set up such that it is released not before the access control unit verified both the task identification and the personal access identification of the administrator as being valid. Alternatively, multiple administrators having different personal access identifications may be required here, wherein the physical access security system is released not before the access control system verified all of the personal access identifications of the administrators in addition to the task identification as being valid.

This way, access control to one or multiple predetermined racks within a computer center can be ensured. The entire system thus requires multiple security requests that can be held available or assigned by separated entities. This increases security against non-authorized access to the rack.

Preferably, the rack is physically, and additionally logically, separated from the key computer system. This way, the computer network infrastructure comprises a multi-entity system, wherein different user groups (security user group for the key computer system and administration user group for the rack) each have access to the respective entities, if required. That means that a security user group has access to the key computer system, but not necessarily to the rack. Accordingly, an administration user group has access to the rack, but not necessarily to the key computer system. This also increases security of the computer network infrastructure in an advantageous manner.

Preferably, the computer network infrastructure comprises an access control unit that detects and transfers the task identification from the key computer system to the access control unit depending on a confirmation of the task by the administrator in a controlled manner. As described above in conjunction with the described method, a transfer of the task identification in a task control unit set up such depending on a confirmation of the task by the administrator. Alternatively, the task control unit may be designed such that task identifications that can be generated by the key computer system are transferred to the access control unit depending on a confirmation of a generated task description. Alternatively, it is possible that a confirmation of the task or of a task description (as described above) is effected generally by an administration user group.

Advantageously, the access security system of the computer network infrastructure comprises at least one of
electronic locks for casing doors,
sensors to monitor the casing doors,
sensors that recognize intrusion attempts, or
electronic switch elements that switch off the energy supply in case of non-authorized physical access to the rack.

The above-mentioned security components physically secure the rack against non-authorized access. Combined with the further security components and entities of the computer network infrastructure, the above-mentioned security components thus constitute effective measures for a secured access control to the rack.

Advantageously, the computer network infrastructure is set up such that a method can be performed according to the ways and manners described herein.

All advantages, measures and procedures in conjunction with the method can also be applied in the context of the computer network infrastructure of the type described herein and apply accordingly. In turn, all advantages and devices of the computer network infrastructure apply also in conjunction with an application in the method described herein. All features of the method are also applicable to the computer network infrastructure and vice versa.

The FIGURE shows a schematic arrangement of multiple security entities of a computer network infrastructure that perform a method to access a physically secured rack 1.

For example, rack 1 comprises one or multiple rack servers of a plurality of rack servers within a computer center (server farm), with the rack 1 being protected physically against non-authorized access by various security measures. For example, rack 1 may comprise electronic locks, sensors that monitor the doors of the rack 1, sensors that detect intrusion attempts and/or electronic switches that switch-off rack 1 or the electronic components accommodated therein in case of an non-authorized access. However, for the sake of clarity, the components are not shown.

For example, rack 1 may comprise one or multiple production computer systems that process data within the computer center, wherein the data may possibly include confidential user data or customer data. As a result, it is necessary that rack 1 is physically secured against non-authorized access to the hardware (e.g., CPU, hard drives, storage tapes, working memory, removable media, I/O interfaces or the like), which is accommodated within the rack 1.

Multiple method steps are required for a physical access to the rack 1, i.e., to open electronic locks or further security barriers.

First, an administration user group 3 sends a request for access to rack 1 to a security user group 7. A request of this type may be made for maintenance reasons of the rack 1, for example. To that end, multiple messages, e.g., via email, may be exchanged in an iterative manner between the administration user group 3 and the security user group 7, which represent separate user groups in the FIGURE (see mail symbols). However, alternatively, it is also possible that a corresponding request (task) is sent to the security user group 7 form another entity (not shown). The FIGURE only shows one of multiple possible options.

A uniform user group may be established as an alternative to the illustrated configuration, wherein a first person needs to make a request for access to the rack 1 to another person of the user group for reasons of security.

The advantage of a request for access to the rack 1 to another person lies with the fact that a multi-person system is set up so that an individual person is not at any time able to effect access to rack 1 on his or her own. Such a principle is also known as a four-eyes principle or (in the case of multiple persons) multi-eyes principle.

Based upon the configuration in the FIGURE, the security user group 7 decides on request of the administration user group 3 if and how one or multiple administrators A, B, C, D of the administration user group 3 get access to the rack 1 or not. The security user group 7 has some kind of security supervision over the administrators of the administration user group 3.

For access to the rack 1, the security user group 7 decides, by way of example, that administrators A and B of the administration user group 3 shall get access to rack 1. If required, the security user group 7 communicates this by a confirmation to the administration user group 3.

The security user group 7 has access to a key computer system 2, by which task identifications, so-called task PINs, can be generated and assigned, the task identifications specifying a task to an administrator A, B, C, D of the administration user group 3 for access to rack 1. That means that a predetermined, possibly restricted access to a predetermined rack 1 can be specified by the task PINs.

Further, the task PINs may be related to persons so that predetermined administrators A, B, C, D are specified for access to the rack 1. Particularly in multiple racks 1, access to an individual rack 1 may be restricted or limited by a specifically assigned Task-PIN. Access to other racks 1 is not released then.

Further, task PINs provide the advantage that documentation of the assigned tasks or traceability of the performed accesses to the rack 1 can be effected in the key computer system 2.

This way, the key computer system 2 functions as a security entity which in the example of the FIGURE generates and assigns in each case one task identification (task PIN) for a specified access to both administrators A and B. Advantageously, the two task PINs for the two administrators A and B are different from one another and personalized. Thus, the two task PINs include the information that an administrator A and an administrator B shall have physical access to rack 1 at the same time. Rack 1 is clearly specified as desired rack by the task PINs. Access to possible other racks (not shown) is forbidden by the task PINs.

In addition, a task description (task) is generated in the key computer system 2, the task description including information or parameters on the specified performance of access of the administrators A and B to the rack 1. For example, the information or parameters determine the ways and manners of how access is set up and performed, for example, time, duration, group of persons, security measures in the rack 1 (e.g., security backup, establishing restore points, encryption of confidential data and the like). As a result, the task assigns further security measures that need to be present besides the task PIN for an access to rack 1. A time period may be specified in the task, within which access to the rack 1 is possible in principle, for example. Further, a time frame may be defined, which defines the duration of access as from the start of access. For example, specification may be made in the task that access is permitted between Monday 12 am and Tuesday 12 am within a time frame of one hour.

As a further security feature, in each case a personal access identification (so-called ID) for all authorized administrators A, B, C, D of the administration user group 3 is stored in the key computer system 2. Advantageously, the ID of the administrators A, B, C, D includes non-transferable personal identification data such as biometric data (fingerprint, iris recognition, retinal scan, hand vein matching, voice profiles and the like).

In a next step, the task PINs, the task as well as personal IDs of the two administrators A and B are transferred from the key computer system 2 to a task control unit 5. At the same time, the task PINs as well as the task are also transferred from the key computer system 2 to the administrators A and B.

In the further course of the method, the task control unit 5 finally awaits a confirmation of the information that was transmitted to the administrators A and B by the administrators A and B. Once the task control unit 5 received a confirmation of the task or the task PIN and/or of the task by the two administrators A and B, the task control unit 5 sends all information (task, task PIN as well as ID of the administrators A and B) to an access control unit 4.

The access control unit 4 is a further security entity that prompts and verifies input of both the assigned and transmitted task PINs by the administrators A and B and prompts and verifies input of the personal IDs of the administrators A and B. The access control unit 4 is advantageously set up at the location of rack 1.

For access to rack 1, the two administrators A and B need to authenticate on the access control unit 4 at the location of the rack 1. To that end, administrator A inputs the task PIN transmitted to him or her to the access control unit 4. Subsequently, the task PIN of the administrator A is verified in the access control unit 4. Further, administrator A enters his/her personal ID on the access control unit 4 (see arrow ID A & B). The personal ID of the administrator A is also verified in the access control unit 4. Administrator B performs the same method for his or her task PIN and for his or her personal ID.

To enter a personal ID, which may include non-transferable personal identification data (as described above), the access control unit 4 may provide corresponding input elements. If, for example, a hand vein match of administrators A and B is expected, a hand vein matching scanner is set up for identification of administrators A and B. The same applies to a retinal scan or iris scan or a voice profile detector.

If, instead of administrators A and B, administrators C and D (shown as a separate group in the FIGURE) intend to perform access to the rack 1, for example, this is going to fail. In fact, administrators C and D would generally be authorized to access rack 1 via their personal IDs, but administrators C and D may possibly not know the task PIN of administrators A and B. Even if administrators C and D knew the task PINs of administrators A and B, the system would nevertheless determine that the personally assigned task PINs for administrators A and B do not match the personal non-transferable IDs of administrators C and D (e.g., because biometric features of administrators A and B do not match C and D). As a result, access control unit 4 detects that it is not the persons requesting access to the production computer system 1 that were assigned the task PINs from the key computer system 2. In this case, the access control unit 4 will deny access to the rack 1 on part of administrators C and D.

When verification of both the task PINs of administrators A and B and personal IDs of administrators A and B are successful, access control unit 4 verifies in a final step whether the task description (task) permits validity of access to the rack 1 or not. When the parameters to perform access to the rack 1 defined in the task correspond to the presently permitted situation, access to the rack 1 may be permitted.

To that end, access control unit 4 sends an instruction Control_Open to a rack control unit 6 to release the physical access security system of the rack 1. In turn, this causes the rack control unit 6 to send a command Command_open to the physical security system of the rack 1 to release the physical access security system. By the Control_Open command, electronic locks are opened, sensors that monitor the doors are switched-off or switched to an authorized access mode or the like, for example. This way, joint access to the rack 1 for both administrators A and B, specifically physical access to the hardware of the secured rack 1, is possible. For example, administrators A and B may perform maintenance work with the rack 1 or the electronic components received therein.

The method described according to the drawing is performed for two administrators A and B. Performing the method for one administrator only or, as an alternative, for more than two administrators, is also conceivable. Generally, the security level is increased the more persons are involved in the process.

Configuration of the illustrated computer network infrastructure is merely exemplary and may of course be adjusted or modified by those skilled in the art without deviating from the principles of the method described herein and the described computer network infrastructure. All nomenclature is merely exemplary.

The invention claimed is:

1. A method of accessing a physically secured rack comprising:
   assigning a task identification by a key computer system, which specifies a task for an administrator of an administration user group for access to the rack;
   transmitting the task identification from the key computer system to the administrator and a task control unit;
   generating a task description by the key computer system for the specified performance of the access of the administrator to the rack,
   transmitting the task description to both the administrator and the task control unit,
   waiting for a confirmation of the task description by the administrator,
   transferring the task identification from the task control unit to an access control unit for the rack if the confirmation of the task description by the administrator is received by the task control unit,
   prompting an input of the task identification by the access control unit;
   verifying the input task identification by the access control unit;
   prompting input of a personal access identification of the administrators by the access control unit;
   verifying the input personal access identification of the administrator by the access control unit; and
   releasing a physical access security system for the access of the administrator to the rack if both preceding verification steps are successful.

2. The method according to claim 1, wherein the personal access identification of the administrator comprises non-transferable personal identification data.

3. The method according to claim 1, wherein a user of a security user group has access to the key computer system to assign the task identification.

4. The method according to claim 1, wherein the access control unit is set up at a location of the rack.

5. The method according to claim 1, wherein the method is performed at least for a second administrator of the administration user group besides a first administrator, a second task identification different from the first task identification, as well as a second personal access identification different from the first personal access identification, is provided for the second administrator, and
   a release of the physical access security system for access of the administrators to the rack is only effected if the verification steps are successful for both administrators.

6. The method according to claim 1, further comprising:
   transferring the task description from the task control unit to the access control unit if the confirmation of the task description was received by the administrator or the administrators from the task control unit; and
   verifying validity of the access of the administrator or the administrators to the rack by the access control unit by the task description.

7. The method according to claim 1, wherein a user of a security user group has access to the key computer system that generates the task description.

8. The method according to claim 1, wherein the task description includes information or parameters on a predetermined time period for the access to the rack and/or a predetermined time frame for the release of the physical access security system of the rack and/or group of persons and/or security measures in the rack.

9. The method according to claim 1, wherein all information generated in the key computer system is signed and/or encrypted.

10. A computer network infrastructure comprising:
    a key computer system that generates and assigns a task identification, which specifies a task for an administrator of an administration user group;
    a rack;
    an access control unit that detects and verifies the task identification as well as detects and verifies a personal access identification of the administrator;
    a task control unit that controls detection and transfers the task identifications from the key computer system to the access control unit depending on a confirmation of the task by the administrator; and
    a physical access security system coupled to the access control unit for controlled access of the administrator to the rack depending on a successful verification of the task identification as well as the personal access identification of the administrator.

11. The computer network infrastructure according to claim 10, wherein the access security system comprises at least one of
    electronic locks for casing doors,
    sensors that monitor the casing doors,
    sensors that recognize intrusion attempts, or
    electronic switch elements that switch-off an energy supply in case of non-authorized physical access to the rack.

* * * * *